United States Patent [19]

Schaeffer

[11] 4,218,754
[45] Aug. 19, 1980

[54] CONTROL OF HIGH SPEED PRINTER BY LOW SPEED MICROPROCESSOR

[75] Inventor: Timothy N. Schaeffer, Arlington, Mass.

[73] Assignee: Data Printer Corporation, Cambridge, Mass.

[21] Appl. No.: 891,297

[22] Filed: Mar. 29, 1978

[51] Int. Cl.$^2$ .............................. G06F 3/12; B41J 5/30
[52] U.S. Cl. ...................................... 364/900; 400/279
[58] Field of Search ........................ 364/900 MS File; 400/279, 280, 281, 282

[56] References Cited

U.S. PATENT DOCUMENTS

| | | | |
|---|---|---|---|
| 3,196,404 | 7/1965 | Furlong et al. | 364/900 |
| 3,408,633 | 10/1968 | Shimabukuro | 364/900 |
| 3,444,529 | 5/1969 | Engelhardt | 364/900 |
| 3,629,861 | 12/1971 | Marsh et al. | 364/900 |
| 3,754,216 | 8/1973 | Kekas et al. | 364/900 |
| 4,009,654 | 3/1977 | Harris, Jr. et al. | 364/900 |

Primary Examiner—Leo H. Boudreau
Attorney, Agent, or Firm—John W. Ericson

[57] ABSTRACT

A control system for high speed printers including a low speed microprocessor that processes data input by a one-time serial operation on the data bytes to direct printing operations into a virtual image memory that is a map of the printing sequence for an entire line. A map of the character printing program for each print position is transferred for each character into a print control memory so that printing can proceed as though a large scale high speed computer was in charge of the printing process.

6 Claims, 11 Drawing Figures

CONTROL OF HIGH SPEED PRINTER BY LOW SPEED MICROPROCESSOR

This application is directed to the art of high speed line printing, and more particularly to a novel print control system for high speed printers.

The high speed printer in common use today has a capacity of from 300 to 1200 lines per minute with up to 136 characters per line. The data transfer rate from the digital computers or other data processing apparatus served by high speed printers to the printer buffer system for the printer is typically 500 kHz. These factors set stringent performance requirements on the printer buffer and on the print control system for a high speed printer, which are required to accept data for a line at the 500 kHz rate, and to provide print command signals for each print hammer at the appropriate times and at a rate governed by the required line rate.

Efforts have been made to improve the performance, and reduce the size and cost, of print control systems for high speed printers, since the conception of the line printer in the late forties, shortly after the invention of the modern electronic digital computer. As the data processing art developed, the higher speed, the smaller size, and the lower cost of the equipment required to execute a given data process were taken advantage of to increase the utility of the high speed printer by reducing the size and cost of the print control system required to interpret the computer to the printer. The result has been the invention of generations of print control systems in which data is processed in the printer buffer, in a repetitious manner, at higher and higher speeds.

Digital computers have been developed along different lines for different applications. A particular version, that has been widely adopted for special purposes where limited computing speed and capacity (by modern standards) are acceptable, is the microprocessor, in which small size and low cost are purchased at the price of longer machine cycles and sequential program execution.

With the print control system at the end of its logical rope in terms of further improvements derived from higher data processing speeds, and with the significant reductions in complexity and cost that have resulted from mechanical inventions that have been made in the art of high speed printer constructions, it would be manifestly desirable to couple the microprocessor to the high speed printer. However, the two microsecond machine cycle of the modern microcomputer, and the data processing demand rates of conventional print control systems, have previously seemed to be, inherently, mutually exclusive.

The object of this invention is to enable a microprocessor to be used as the central processing system for a high speed printer. The invention is particularly directed to chain type printers in which different characters are simultaneously printed in different columns; although, in its broader aspects, the invention is applicable to drum type printers in which the same characters are either simultaneously or sequentially printed in different columns.

Briefly, the above and other objects of the invention are attained by a novel system architecture for the print control and buffer system in which the microprocessor (microcomputer, central processing unit, or CPU), is used in direct memory access (DMA) mode to direct the flow of incoming data through a code converter to an input data memory, where a line of data is stored at the input data rate until it can be dealt with at lower speeds. A virtual image memory is provided, into which the CPU directs the loading of true bits from the stored line of data into each position corresponding to a character that will be printed in each column. The hammers for each column are grouped in banks, and for each bank there is provided a shift register that has a storage location for each hammer associated with the bank. As each of a set of characters comes into printing position relative to the hammers for the several columns, a map of the column in which they are to be printed is copied into a group of shift registers. The contents of the shift registers are directed to the hammer control circuits in parallel, and the hammers selected are fired at appropriate times.

In accordance with a preferred embodiment of the invention, for the highest line rates to be accommodated, where the hammer driver excitation time exceeds the time available between character pulses, a double load feature is provided. In this embodiment, for each true bit loaded into the virtual image memory for a given character to be printed, a true bit is loaded into the next print position for the next character that will come into position for the same column. This feature doubles the printing time available relative to the print cycle data processing time available.

The apparatus of the invention, and its mode of operation, will best be understood in the light of the following detailed description, together with the accompanying drawings, of a preferred embodiment thereof.

Figure 1:
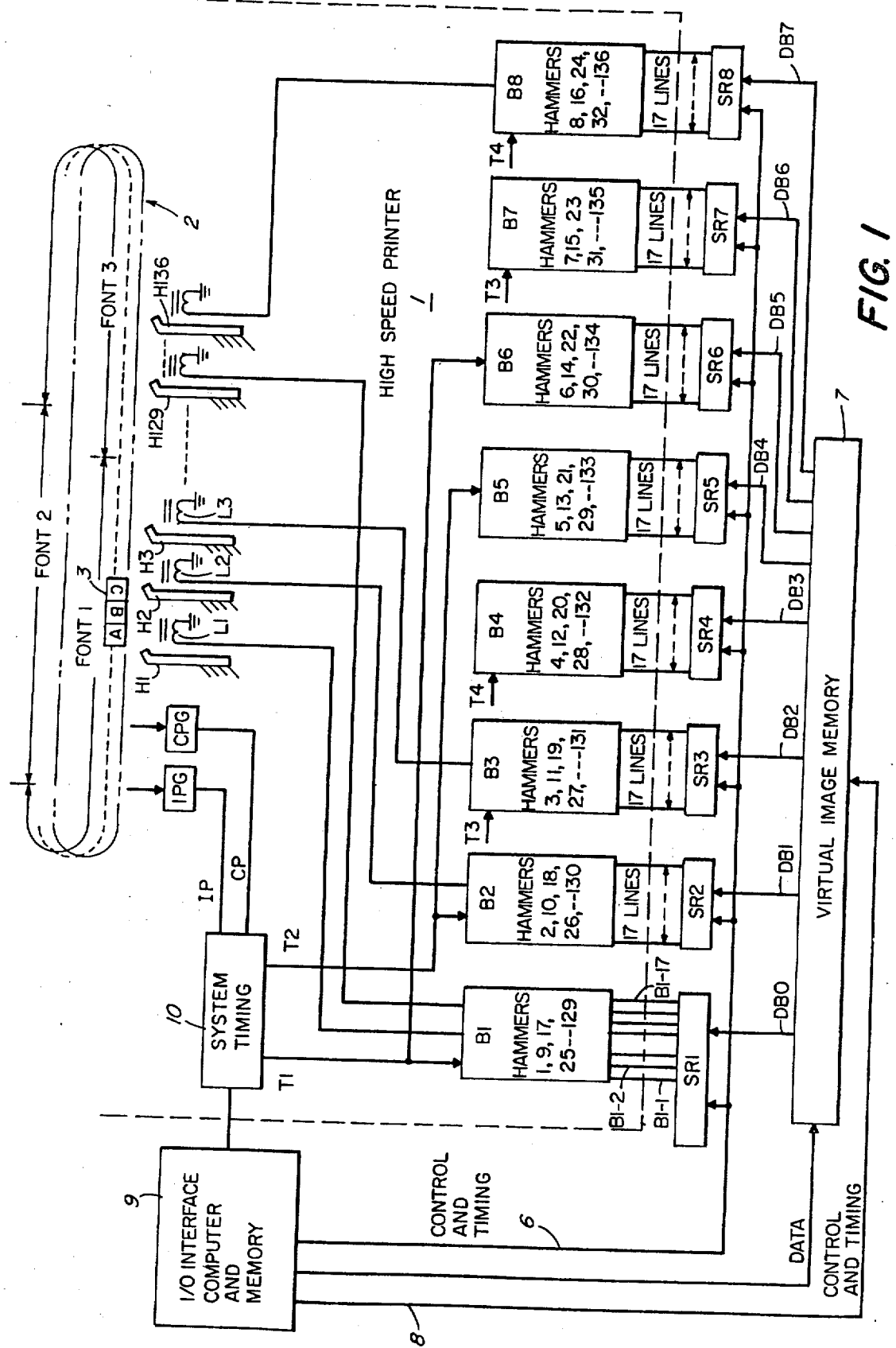
FIG. 1 is a schematic block and wiring diagram of a 136 column, 128 character print control system in accordance with the invention showing its interface with a chain type high speed printer and suggesting the interface between the print control system and external data processing apparatus serviced by the printer.

FIG. 1 shows the essential aspects of the interface between a computer and a high speed printer system in accordance with the invention in sufficient detail to illustrate the relationships and structures involved without redundant and repetitive detail. The apparatus shown comprises a high speed printer generally designated 1, of any conventional design and construction, such as the CHAINTRAIN printer as made and sold by Data Printer Corp., Of Cambridge, Mass.

As illustrated, the printer is of the chain type, in which a series of fonts of characters, for example, three fonts of 128 characters each, is arranged on an endless belt to pass successively into printing position with respect to a bank of 136 hammers H1 through H136, of which five typical hammers are shown. The endless belt suggested at 2, and the type segments thereon, may be of the kind shown and described in more detail in U.S. Pat. No. 3,972,282, granted on Aug. 3, 1976 to Joseph Konkel for Type Train Assembly for Printing Machines.

In accordance with one commercial practice of the invention, the hammers H1 through H136 are spaced on 1/10th inch centers, and the characters such as 3 are spaced on 1/7.5 inch centers. This relationship is significant in determining certain relationships between the character codes directing the printing of particular characters in particular columns in a manner that will be described in more detail below.

As suggested in FIG. 1, the printer comprises conventional apparatus for producing timing signals determining the position of the fonts and characters on the endless belt 2, such as an index pulse generator IPG and a character pulse generator CPG. These devices produce index pulses IP and character pulses CP in a conventional manner that are instrumental in determining the position of the individual fonts of characters, and of the different characters on each font, on the endless belt 2; the index and character pulses are used to establish the appropriate times for firing the hammers H1 through H136 to produce the printing of a line in a conventional manner.

As is conventional in the art, each of the hammers, such as H1 and H2, is adapted to be energized, or fired, in response to the application of current to a corresponding solenoid, such as L1 and L2, to attract the hammer electromagnetically into contact with the record paper sheet, carbon ribbon, and any additional carbon ribbons and record sheets provided, and thence ultimately into engagement with the appropriate character 3 on the endless belt 2 to effect printing of the character on the sheets of paper.

In order to distribute the current driving signals to the hammer driving solenoids L1 through L136, in accordance with one presently preferred practice, the solenoids L1 through L136 are each connected to one of eight hammer driver boards B1 through B8 in FIG. 1, each of which is responsible for directing an appropriate current signal to its hammer driver coil at the appropriate times in a manner to be described in more detail below.

Specifically, a bank B1 of hammer driver circuits is responsible for the control of hammers 1, 9, 17, 25 and so on through 129. A bank B2 is responsible for hammers 2, 10, 18, 26 and so on through 130, and so forth.

It will be apparent that the distribution of responsibility across the banks is from 1 through 8 for banks B1 through B8, from 9 through 16 for banks B1 through B8, and so forth. Each hammer driver circuit for the 136 column printer shown is thus responsible for 17 individual hammers. It may be helpful to note that eight times 17 equals 136.

The individual hammer driver banks B1 through B8 each have 17 input data lines shown in illustrative part for the bank B1, labeled B1-1 through B1-17 for that bank, and shown more generally for the others. Each of these data lines B1-1 through B1-17 for the hammer bank B1, for example receives a data bit at logic 1 for each print position for each of the 17 hammers in its bank for each character as it comes into printing position if that character is to be printed by that hammer. In other words, when character A comes into printing position with respect to hammer H1 and that character is to be printed in column 1, bank B1 will have a true bit in its memory at that time which, coming into coincidence with the appropriate print phase and timing signals to be described, will cause the energization of the corresponding coil, such as L1, to drive the hammer H1 into contact with the character A through the intermediate paper and ribbon conventionally provided. The effective hammer driving signal to the solenoid, such as L1, will be produced by closing an electronic switch in a conventional manner that need not be described in detail because it will be familiar to those skilled in the art.

Each of the hammer driver banks B1 through B8 is supplied with data at times that will be apparent from the following description by a corresponding 17 stage, one bit per stage, shift register SR1 through SR8, shown schematically in FIG. 1. The shift registers SR1 through SR8 are each loaded serially, from a buffered bidirectional data bus comprising eight lines labeled DB1 through DB7 in FIG. 1, on which data are supplied in the data transfer mode, as determined by a control and timing bus suggested at 6 in FIG. 1, from a virtual image memory 7 in FIG. 1. The virtual image memory 7 receives control and timing signals over a bus suggested at 8 in FIG. 1 from an I/O interface, computer and memory system generally designated 9 in FIG. 1. The shift registers SR1 through SR8 are unloaded in parallel, at times to be described, over 17 lines each, such as the lines B1-1 through B1-17 for the shift register SR1, each such set being connected to a different one of the hammer driver banks B1 through B8, respectively.

In particular, as directed by a system timing block labeled 10 in FIG. 1, the I/O interface and computer memory system 9 will respond to character pulses CP from the character pulse generator CPG in FIG. 1, as regulated by index pulse generator pulses IP from the index pulse generator IPG in FIG. 1, to call for the transfer of data, for each character coming into position relative to column 1 on the chain, from the virtual image memory 7, to be distributed to the shift registers SR1 through SR8, and thence in parallel to the hammer driver banks B1 through B8; so that, as the several characters come into position relative to different hammers, the true bits will be directed to the hammer driver for each column in which those characters are to be printed at the appropriate time to cause actuation of the hammers.

Figure 2:
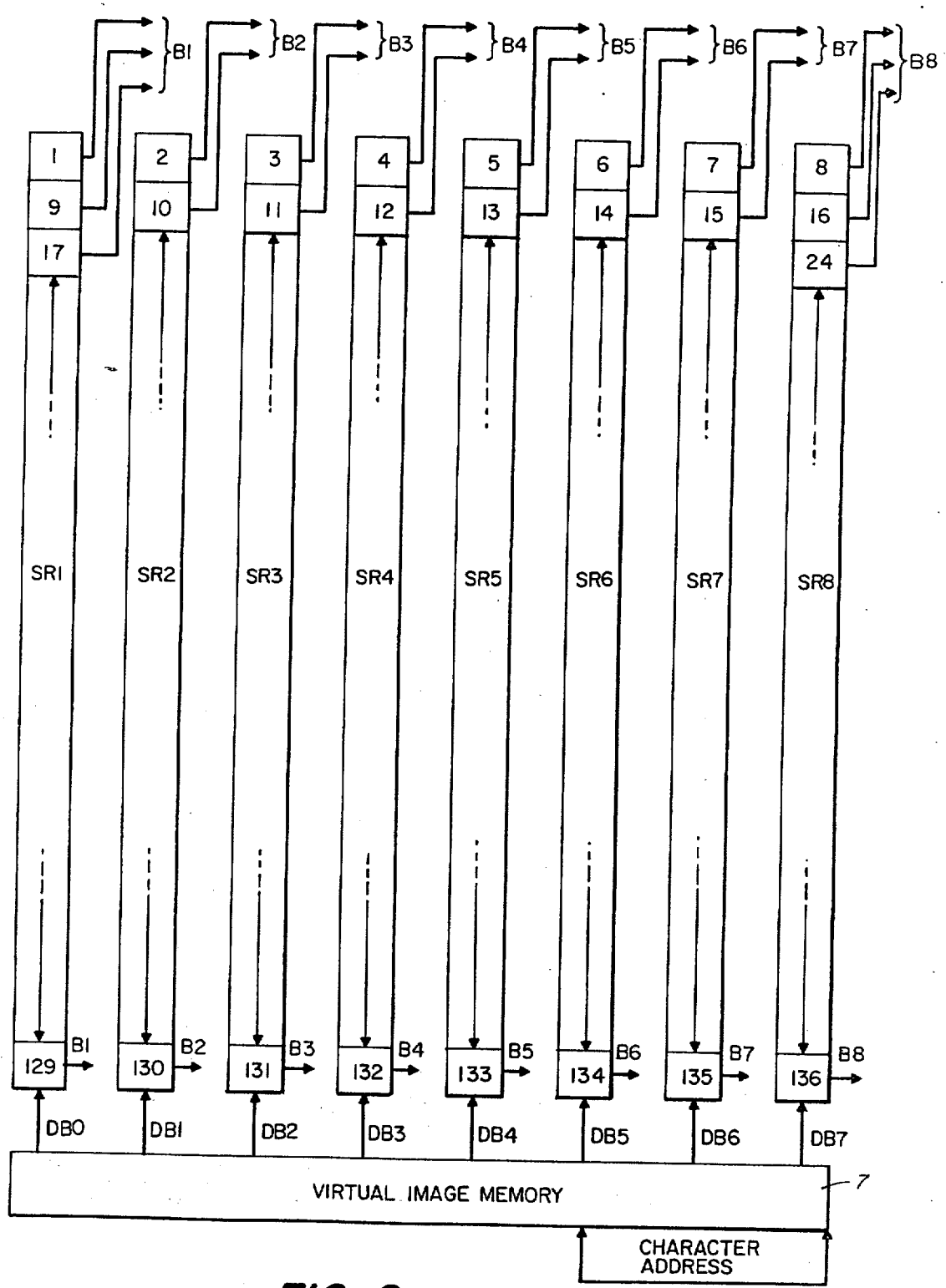
FIG. 2 is a schematic block and wiring diagram of a virtual image memory and a set of shift registers comprising portions of the system of FIG. 1.

The organization of the virtual image memory 7 of FIG. 1, and the manner in which it distributes information to the shift registers SR1 through SR8, are shown in more detail in FIG. 2. Referring to FIG. 2, a character address supplied to the virtual image memory 7 will cause eight bits of data to be supplied to the shift registers SR1 through SR8, the first such set being concerned with hammers 1 through 8 supplied to the shift registers SR1 through SR8 respectively, in that order, the second such set being supplied to the registers SR1 through SR8 for hammers 9 through 16 respectively, and the last such set being supplied to the registers SR1 through SR8, for the final hammer register stages for hammers 129 through 136 of the shift registers SR1 through SR8, in that order, as shown in FIG. 2. Accordingly, as each character position relative to column 1 on the chain is approached, a true bit for each column that is to be printed at the corresponding time, which will signify a different character for each column in accordance with the location of the characters in the font relative to that column and to column 1, will be loaded into the appropriate stage of the appropriate one of the shift registers SR1 through SR8. Thus, for each of the 136 columns that can be printed, there will be supplied to the shift registers SR1 through SR8 a true bit in response to the approach of the appropriate character to the appropriate column in printing position. This character will not be the same for every hammer for every character, because if character A is in printing position relative to character 1, it will not be in printing position for character 2. This factor is taken into account in a manner to be described.

Figure 3:
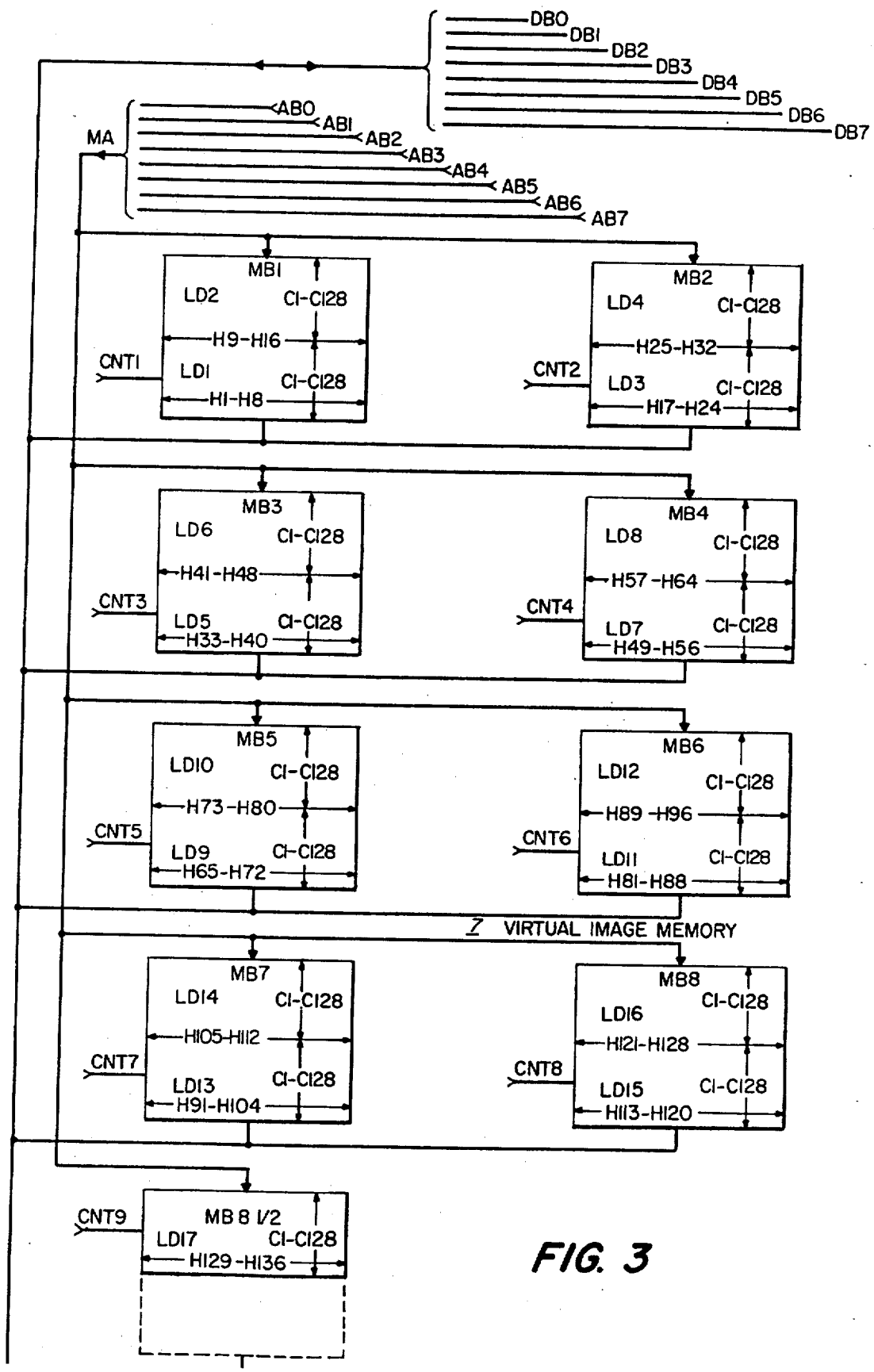
FIG. 3 is a schematic block and wiring diagram showing the virtual image memory of FIGS. 1 and 2 in more detail.

FIG. 3 shows the virtual image memory 7 in more detail. As shown, the memory comprises nine banks labeled MB1, MB2, and so on through MB8½. Each memory bank of the set MB1 through MB8 comprises two stacks, labeled LD1 through LD16. Each stack comprises one byte of eight bits of data, one for each of eight different hammers, for each of 128 characters. The memory block MB8½ comprises one stack labeled LD17 comprising eight bits of data for each of eight hammers for each of 128 characters. Thus, a character address comprising seven bits identifying a character and five bits specifying one of the stacks can call forth a byte of eight bits each specifying a command to print, or not print, in a different one of eight columns.

Figure 4:
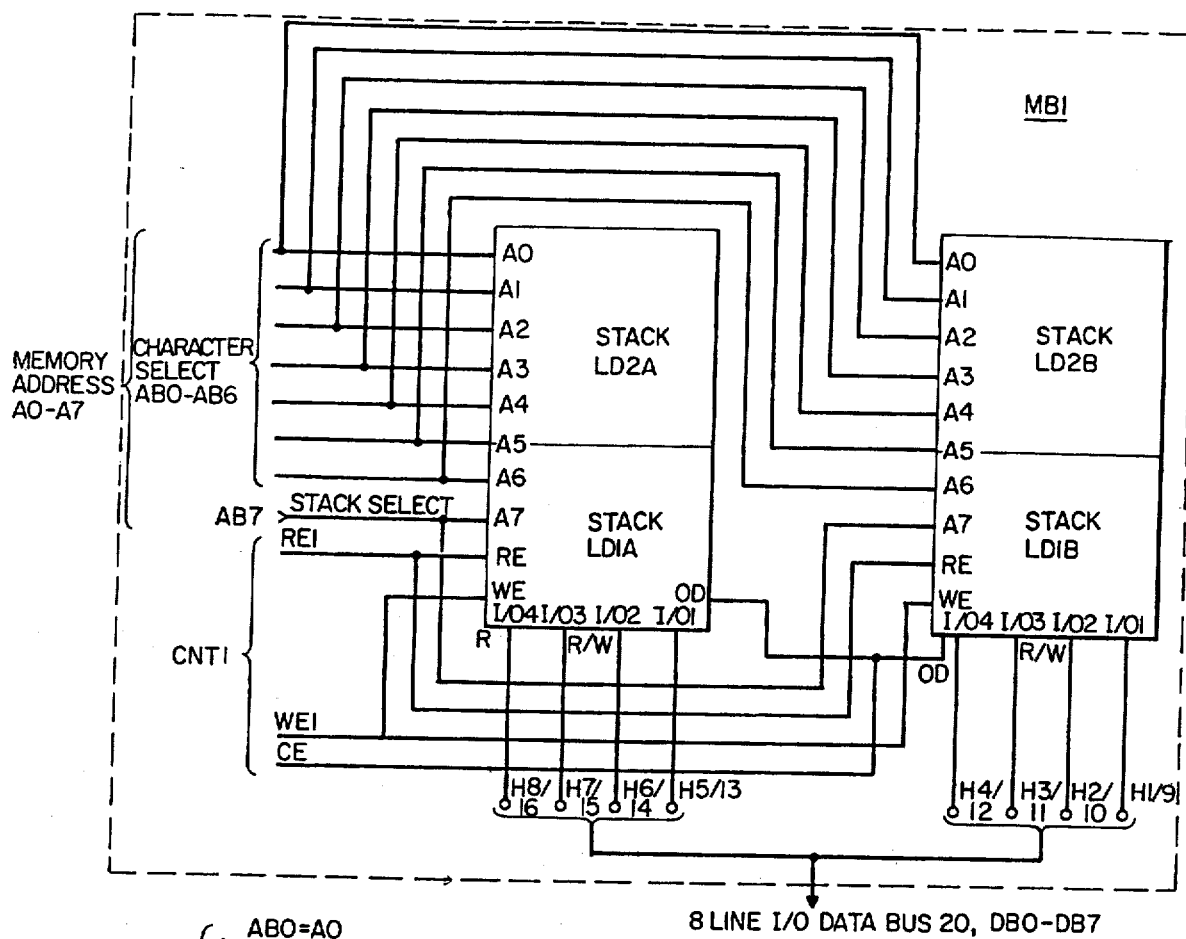
FIG. 4 is a schematic block and wiring diagram of a memory block forming a portion of the virtual image memory of FIG. 3 in more detail.

The memory blocks, labeled MB1 through MB8½, are shown in representative detail for the memory block MB1 in FIG. 4. As shown in FIG. 4, each of the memory blocks, such as MB1, may comprise a pair of memory units, specifically, for example, the 2111-1 Memory as manufactured and sold by Intel Corp. of Santa Clara, Calif., and described in their catalog published in 1975 on pages 2-93 through 2-96. The 2111-1 Memory basically consists of a four bit output, eight bit input address, random access memory. A pair of these units, as indicated in FIG. 4, provides eight output bits on buffered data bus lines DB0 through DB7 that are accessible for reading or writing purposes by addressing the appropriate buffered input address data lines AB0 through AB7. These lines are labeled within the dotted lines around the block MB1 to indicate the significance of the data; e.g., the lead labeled H1/9 represents hammer H1 or H9, depending on which of stack segments LD1A and LD1B, respectively, of stack LD1, are selected by the stack select bit applied to pin A7 from buffered address bus AB7, and so forth. The terminals A0 through A6 select the appropriate character, and the terminal A7 provides a high order address which determines the stack in the memory block in which one of the 128 characters is being addressed. As indicated, the 128 character stack LD1 in FIG. 3 comprises half of each of the memory units, shown as LD1A and LD1B in FIG. 4. Similarly, the stack LD2 in FIG. 3 comprises the memory portions LD2A And LD2B in FIG. 4. A control bus, labeled CNT-1, is provided to supply the logical signals RE1, WE1 and CE, respectively. The signal RE1 enables a read operation, the signal WE1 enables a write operation, and the signal CE present at Logic 0 enables both stacks, and present at logic 1, disables both stacks in the memory block. Seventeen of these stacks, times eight bits per stack, times 128 characters per stack equals 17,408, or one bit position for each character for each hammer in the printing array.

Figure 5:
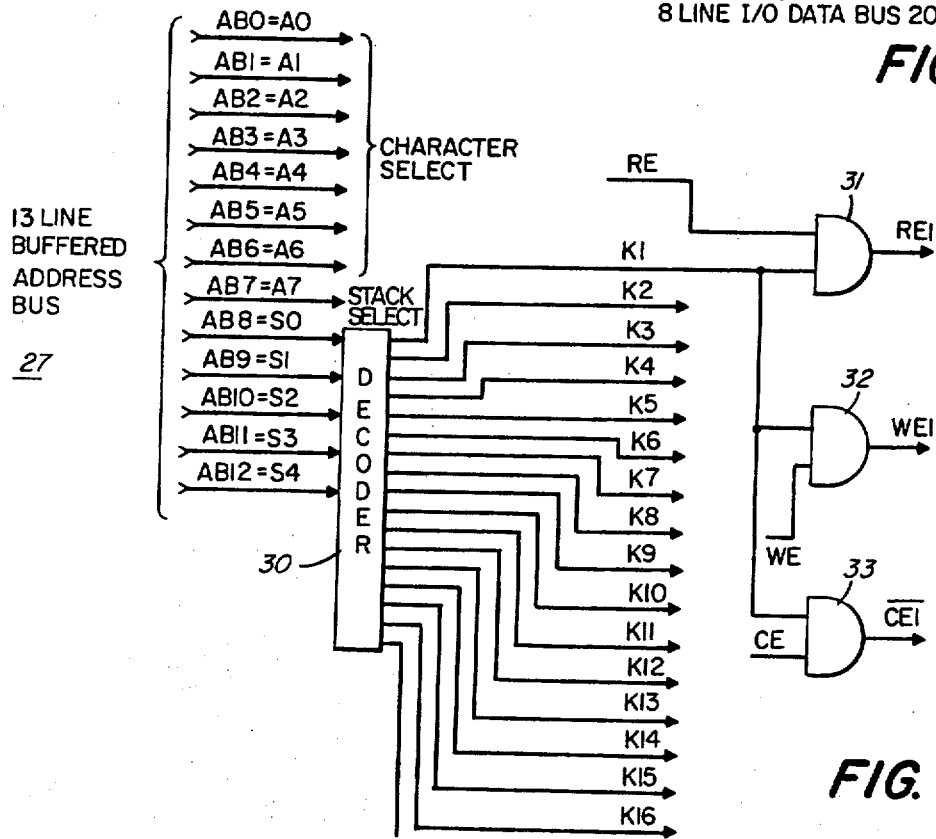
FIG. 5 is a schematic block and wiring diagram illustrating the manner in which control signals are developed for selecting the memory blocks of FIGS. 2–4.

FIG. 5 illustrates the manner in which control signals, such as the signals CNT1, CNT2, etc., are developed for the several memory blocks in FIG. 3, and in illustrative detail, for the block MB1 in FIG. 4. As shown, address data is made available at appropriate times on a buffered address bus 27 comprising 13 lines labeled AB0-AB12. The lower ordered 8 of these lines, AB0-AB7, are used in the manner shown in FIG. 4 to select the character and stack in the virtual image memory. The higher ordered five of these lines, AB8-AB12, are applied to a conventional decoder 30 to produce a logic 1 signal on one of 17 output lines K1-K17, each of which selects a different one of the available 17 memory stacks.

As shown in FIG. 5 in illustrative detail for the block MB1 in FIG. 4, a logic 1 signal on the line K1 is applied to three AND gates 31, 32, and 33. The gate 31 also receives the signal RE, which present at logic 1 produces the signal RE1 to enable a read operation into the memory block selected by the Ki signal, in this case K1, that is present at logic 1. Similarly, a write operation is enabled by the signal WE applied to the gate 32 at logic 1 in the presence of K1 at logic 1. A logic 1 signal CE, meaning enable the device, with the signal K1 at logic 1 produces $\overline{CE1}$ from the gate 33 to select the memory block MB1.

It will be generally apparent from the above description how a character by character map of the printing sequence can be delivered to the hammer driver boards B1 through B8 in FIG. 1, from the shift registers SR1 through SR8 in FIG. 2, and from the virtual image memory just described in connection with FIGS. 3 and 4. The next significant point, the manner in which the virtual image memory of FIGS. 3 and 4 is loaded from incoming data, will best be understood in the light of the following detailed description of the overall control system with respect to the system block diagram of FIG. 6.

In many respects in which great detail would otherwise be required, the system is conventional and may be described with respect to publications of the manufacturers who produce the equipment involved. Perhaps the most complex of these elements is a central processor labeled CPU in FIG. 6, which is in simplest terms a conventional microprocessor that may be of the type manufactured and sold by the Intel Corporation of 3065 Bowers Ave., Santa Clara, Calif., and described in their elaborate system User's Manual published in September 1975 as the Intel 8080 Microcomputer System User's Manual. This manual incorporates so much of the essential detail required to relate the invention to known matters, and to establish the invention in its intended environment, that it is hereby incorporated herein by reference in its entirety, although specific references will be made to particular pages hereinafter from time to time. The particular computer to be described is the 8080A. This CPU and its attendant circuits are put under the control of a conventional clock generator and driver generally designated 12, which may take the form of an 8224 unit labeled clock generator and driver in FIG. 6 and described in more detail on pages 5-1 through 5-6 in the above cited User's Manual.

The CPU is used under priority interrupt control by a priority interrupt controller 13, which essentially comprises an 8212 eight bit I/O port described on pages 5-101 through 5-109 of the above Intel User's Manual, combined with an 8214 priority interrupt control unit described on pages 5-153 through 5-160 of the User's Manual, in the manner shown in detail on page 5-157 of the above cited User's Manual. The priority interrupt controller 13 essentially allows the CPU to perform its assigned programmed tasks except when interrupted by an external command, or by a printer directed interrupt command as will be explained below.

Figure 6:
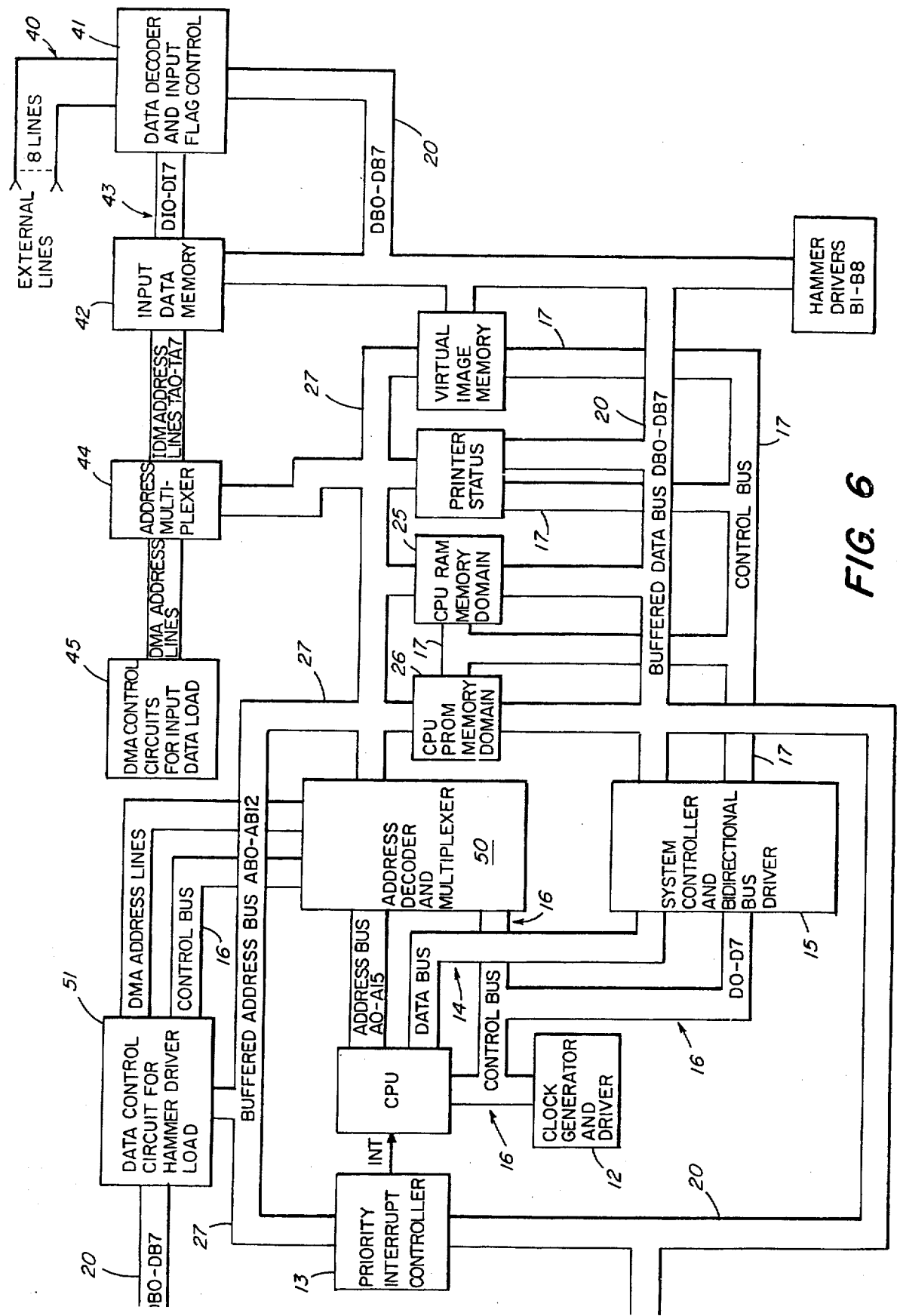
FIG. 6 is a schematic block and wiring diagram of the I/O interface, printer buffer, microprocessor and print control system forming a part of the apparatus of FIG. 1.

The CPU communicates over a bidirectional data bus comprising eight lines labeled D0 through D7, as shown in block form at 14 in FIG. 6, with a system controller and bidirectional bus driver generally labeled 15 in FIG. 6. The system controller and bidirectional bus driver 15 in FIG. 6 consists of an Intel 8228 unit described and connected as shown in detail on pages 5-7 and 5-12 of the above cited Intel User's Manual, that basically responds to signals received on a control bus generally labeled 16 in FIG. 6 and comprising four lines to direct signals on the bus 14 to the buffered data bus 20 for transfer to any destination unit selected under program control, or to direct signals on the buffered data bus 20 from any selected source to the CPU bus 14, also under program control. It will be understood by those skilled in the art that the overall system described is a dedicated source-destination type computer with a high speed printer as a peripheral device servicing a data processing system having an output to be printed in which the printer acts as both a source and a destination for the CPU.

Most of the system shown in FIG. 6 will be readily understood by those skilled in the art to be a conventional CPU combined with its usual adjuncts of memory and address decoders and multiplexers which enable the conventional source-destination mode of computer access and control. As described in the above cited Intel User's Manual, the essential communication channels are essentially bidirectional buses that are made available by a three-state mode of operation of the devices to which the buses are connected, including the 8080A CPU, whereby each device can act as a sender or receiver, placing or accepting active low or active high signals on the leads comprising the buses in response to appropriate data selection signals, or whereby each device can be effectively decoupled from the bus by being placed in a high impedance mode in which it does not transmit or respond to data on the bus. This matter is fully covered and described in the literature available to those skilled in the art, and in more specifically appropriate form in the above cited Intel User's Manual.

In particular, there are some memory domains which are accessible only to the CPU. Among these are a CPU random access memory domain generally designated 25 and including, in one practical embodiment, five 2111-1 Intel silicone gate MOS static RAM memories, as described on pages 2-93 through 2-96 of the Intel Data Catalog, published in 1975 by Intel Corporation of 3065 Bowers Ave., Santa Clara, Calif. Each such 2111-1 memory comprises a 256 by 4 static random access memory with 1,024 bits.

These RAM units are organized in a conventional fashion into a 192 by 12 vertical format memory, a 64 byte stack memory, and a 128 byte scratch pad memory. Three of the 256 by 4 common I/O static memories type 2111-1 are used for the VF memory and the higher order half of two others for the scratch pad. The stack memory is used in the fashion described in the Intel Microcomputer System User's Manual for the purpose of transferring current program counter contents onto the stack in response to an interrupt control to service the interrupt and then, after the interrupt service has been acknowledged by the user device, to return the program contents to the computer CPU for the purpose of resuming the program in a conventional manner.

A second memory domain accessible only to the CPU is a programmable read-only memory 26. The memory 26 may comprise 3,000 bytes of eight bits per byte for storing microinstructions which control system operation and comprise a portion of the computer program. The memory 26 may be implemented by six 4096 bit Schottky bipolar 3624 memory units, each having eight output data lines which are connected to the buffered data bus 20, and 12 input data lines, of which eight are address lines and four are chip select lines. Since it is a read-only memory, the lowest ordered 12 lines of the address bus of a 13 line address bus 27 are connected to the eight address input lines and the four chip select lines of each of the 3624 units to select any of the used 3,000 memory locations from the 3,072 locations available. The 3624 programmable read-only memory is described in more detail on pages 3-40 through 3-44 of the Intel Data Catalog, published in 1975 by Intel Corporation, cited above.

Figure 11:
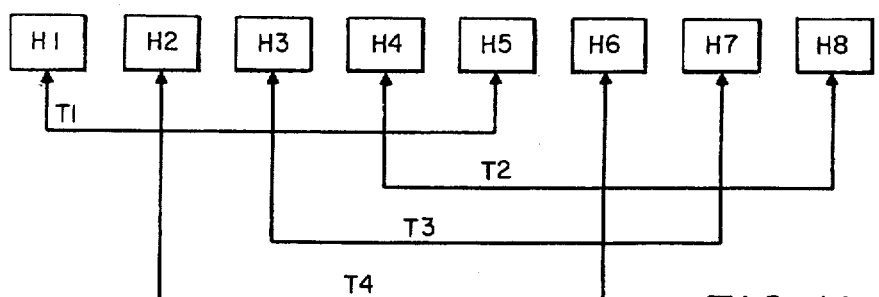
FIG. 11 is a schematic diagram illustrating the relationship between characters on the chain relative to print hammers in the illustrative embodiment of the invention.

Referring to FIGS. 1 and 11, and recalling the above remark that in the particular illustrative embodiment described herein, the hammers are spaced on 1/10-inch centers and the characters on the chain 2 are spaced on 2/15-inch centers, the several characters come into printing position with different hammers in groups. In particular, every fourth hammer sees a different character come into position at the same time. More specifically, hammers 1 and 5 see characters approaching print positions simultaneously, hammers 2 and 6 see characters approaching simultaneously, as do hammers 3 and 7, and 4 and 8 respectively. This matter governs the assignment of hammers into the several banks B1 through B8, and governs the application of hammer firing timing signals T1 through T4 to the several hammer banks accordingly. There are four such hammer firing timing signals T1 through T4, provided by the system timing unit 10 in a conventional manner and each occurring once for each character pulse CP. The timing pulses T1 through T4 occur sequentially, as shown in FIG. 11, in response to each character pulse CP.

Figure 10:
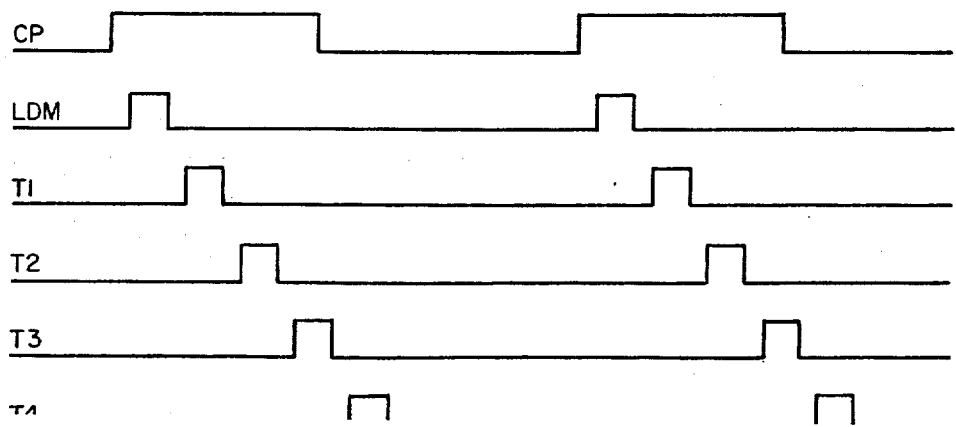
FIG. 10 is a timing diagram showing the sequence of hammer firing signals produced in the system of FIGS. 1–9 and used to distribute firing times to appropriate columns.

As indicated in FIG. 1, the timing pulses T1 are applied to hammer banks B1 and B5 because each of the hammers 1, 9, 17, 20, and 25, and in that series to 129, of the bank B1, as well as each of the hammers 5, 13, 21, and 24, and in that series to 133 of bank B5, see some character approaching printing position simultaneously. By the same reasoning, the pulses T2 are applied to banks B2 and B6, the pulses T3 are applied to banks B3 through B7 and the pulses T4 are applied to banks B4 and B8, respectively. These pulses T1 through T4 are gated in a conventional manner with the firing command signals generated on the lines, such as B1-1 through B1-17, from the shift register SR1, so that the occurrence of the timing pulse T1, for example, during the interval in which some of the lines B1-1 through B1-17 indicate a fire command, will cause the firing of the appropriate hammer at the appropriate time to find its approaching character in print position. The reasonability for the assignment of print commands on the several lines, such as B1-1 through B1-17, for the several shift registers is determined in a manner to be described below. As indicated in FIG. 10, each character pulse CP is caused to generate a load memory pulse LDM in a conventional manner, in response to which the four sequential timing pulses T1-T4 are produced by conventional circuits.

Basically, the shift registers SR1 through SR8 are loaded from the virtual image memory 7, once for each character pulse CP generated by the character pulse generator CPG under the direction of the index pulse generator IP, which produces a pulse for each font as each font enters the scene, in a manner that is very simple for the first hammer H1 that serves column 1. In particular, the character pulse generator CP will advance a conventional counter in the system timing unit 10 so that its contents represent character A just after it has been reset by the index pulse IP for each approaching character font. Thus, as the first line B1-1 from the shift register SR1 is active or inactive when the timing pulse T1 is produced, the hammer H1 will be fired if A is to be printed in column 1.

The situation with respect to the subsequent columns is less direct, but well understood in the art, and will next be explained for clarity. Specifically, as characters in the input data memory are supplied to the CPU over the data buses 20 and 14 through the system controller and bidirectional bus driver 15 under program control by the CPU in the data processing mode, the character code for each column is entered into the CPU's accumulator register, to which there is added or subtracted a number that is a function of the column position. Thus, the character code for column 1 is not adjusted. The adjustment for the character codes for the subsequent columns will next be described. This adjustment is made in accordance with the facts that each character is represented in a code in an ascending binary sequence from 0000000 for character 1 to 1111111 for character 128; that each hammer is on a center 1/10-inch from the adjacent hammers; and that each character is on a center 2/15-inch from the adjacent characters on the chain. Thus, while the timing of the approach to printing position of the various characters is governed by the sequential signals T1, T2, T3, and T4 in the manner described above, the meaning of a character code for a given column, relative to the character code for column 1, is described in the following Table I:

Table I

| Column | Character | Add to Code |
|--------|-----------|-------------|
| 1 | 1 | 0 |
| 2 | 2 | 1 |
| 3 | 3 | 2 |
| 4 | 4 | 3 |
| 5 | 4 | 3 |
| 6 | 5 | 4 |
| 7 | 6 | 5 |
| 8 | 7 | 6 |
| 9 | 7 | 6 |
| 10 | 8 | 7 |
| 11 | 9 | 8 |

Table I-continued

| : | : | : |
|---|---|---|
| : | : | : |

The conversion process indicated in Table I above can be carried out by a repetitive subroutine involving the accumulator register ACR in the CPU, an auxiliary tracking register BCR, and the ALU in the CPU, in which the register BCR tracks the column number as the various characters are called into the accumulator register ACR, in the following manner:
1: Character code for column 1 to ACR from IDM
Step 2: Reset BCR
Step 3: Add BCR to ACR
Step 4: ACR contents used as character address to VIM
Step 5: Logic 1 to current column at that address in VIM
Step 6; Add 1 to BCR
Step 7: Character code for column 2 to ACR from IDM
Step 8=Step 3
Step 9=Step 4
Step 10=Step 5
Step 11=Step 6
Step 12: Character code for column 3 to ACR from IDM
Step 13=Step 3
Step 14=Step 4
Step 15=Step 5
Step 16=Step 6
Step 17: Character code for column 4 to ACR from IDM
Step 18=Step 3
Step 19=Step 4
Step 20=Step 5
Step 21: Character code for column 5 to ACR from IDM
Step 22=Step 3
Step 23=Step 4
Step 24=Step 5
Step 25=Step 6
Step 26: Character code for column 6 to ACR from IDM
Step 27=Step 3
Step 28=Step 4
Step 29=Step 5
Step 30=Step 6 and so forth; the machine process consists essentially in adding nothing to the character code for columns 1, 5, 9, 13, 17, and so on, and adding 1 to the BCR addend for columns 2, 3, 4, 6, 7, 8, etc. The details of the program written to implement this procedure may be varied to suit the programmer, and the particular CPU employed. In principle, it is a matter of recognizing the spatial relationships between the characters on the fonts and the several hammers relative to a given character in printing position relative to the same character in printing position with respect to the hammer H1 for column 1.

In order to implement the double load feature described above, the program sequence can be modified as follows:

After each of Steps 5 in the above sequence, increment ACR by 1, repeat Step 5, and then proceed. This will result in a call to print for the next character coming into printing position at each hammer location for which a print command has been issued, thus doubling the length of the print command signal for that hammer, while allowing the printing process to continue for other columns. Since only one character is printed to each column for each line, no logical problems are introduced by this approach, except that printout must be called for only as the first character of a font approaches printing position relative to some particular print column, such as column 1. In other words, the print callout must begin with an index pulse signalling the approach of, for example, character 1 to column 1 in print position. With a single load made of operation, printing can be commenced with any character approaching print position. Given three fonts on each chain, the difference in actual line printing times is quite small, while the increase in overall line rates is considerable.

Since the manner in which the system is implemented by conventional integrated circuit chips, once the basic organizing concepts are perceived, is quite simple, whereas the organizing concepts are difficult to grasp, a somewhat fuller explanation of the character timing will next be given with reference to FIG. 11. FIG. 11 shows hammers H1 through H8, assumed to be on 1/10-inch centers. Given this fact, the distance from the centers of every hammer to every succeeding fourth hammer, such as the hammers H1 and H5, H2 and H6, etc. is 0.4-inch. Since the characters in the chain are on 2/15-inch centers, the distance between each character on the font and each succeeding third character, such as the characters C1 and C4, C2 and C5 and so on, is also $3 \times 2/15 = 0.4$-inch. Thus, character 4 will be in registry with hammer H5 when character 1 is in registry with hammer H1. As characters 1 and 4 approach printing position with respect to hammers H1 and H5, respectively, at a time synchronized with pulse T1 (FIG. 1), they will be followed by characters 2 and 5 approaching hammers H2 and H6, respectively, at a time synchronized with pulse T2. Next, characters 3 and 6 will approach hammers H3 and H7, respectively, at pulse time T3. Finally, characters 4 and 7 will approach hammers 4 and 8, respectively, at pulse time T4. Thus, within a given time frame defined by the sequential timing pulses T1-T4 occurring for each character pulse CP, the meaning of characters C1 (or C1+i, where i=0, 1, 2, . . . 128 approaching hammer H1 can be translated into C1+1 (or C1+i+1) for hammer H2, C1+2 (or C1+i+2) for hammer H3, C1+i+3 for hammer H4, C1+i+3 for hammer 5, C1+i+4 for hammer H6, and so forth. Since there are three fonts and 128 characters per font, each occurring in the same sequence, there will be more than one font present relative to the bank of hammers at a given time, but there is no need to distinguish character 1 on font 1 from character 1 on font 2 or font 3.

Details of subsidiary conventional portions of the system have been left for the concluding paragraphs of this description to avoid obfuscation of the central aspects of the invention, because their functions and modes of implementation will be apparent to those skilled in the art from the preceding description of the invention, and because particular equivalent embodiments that perform the same functions but differ in many nonessential details will be chosen by the artisan on the basis of economic considerations that will vary as progress and changes are made in the commercially available components. However, for the sake of completeness, a brief description of the adjunctive system components that were employed in a particular embodiment will be given.

Figure 7:
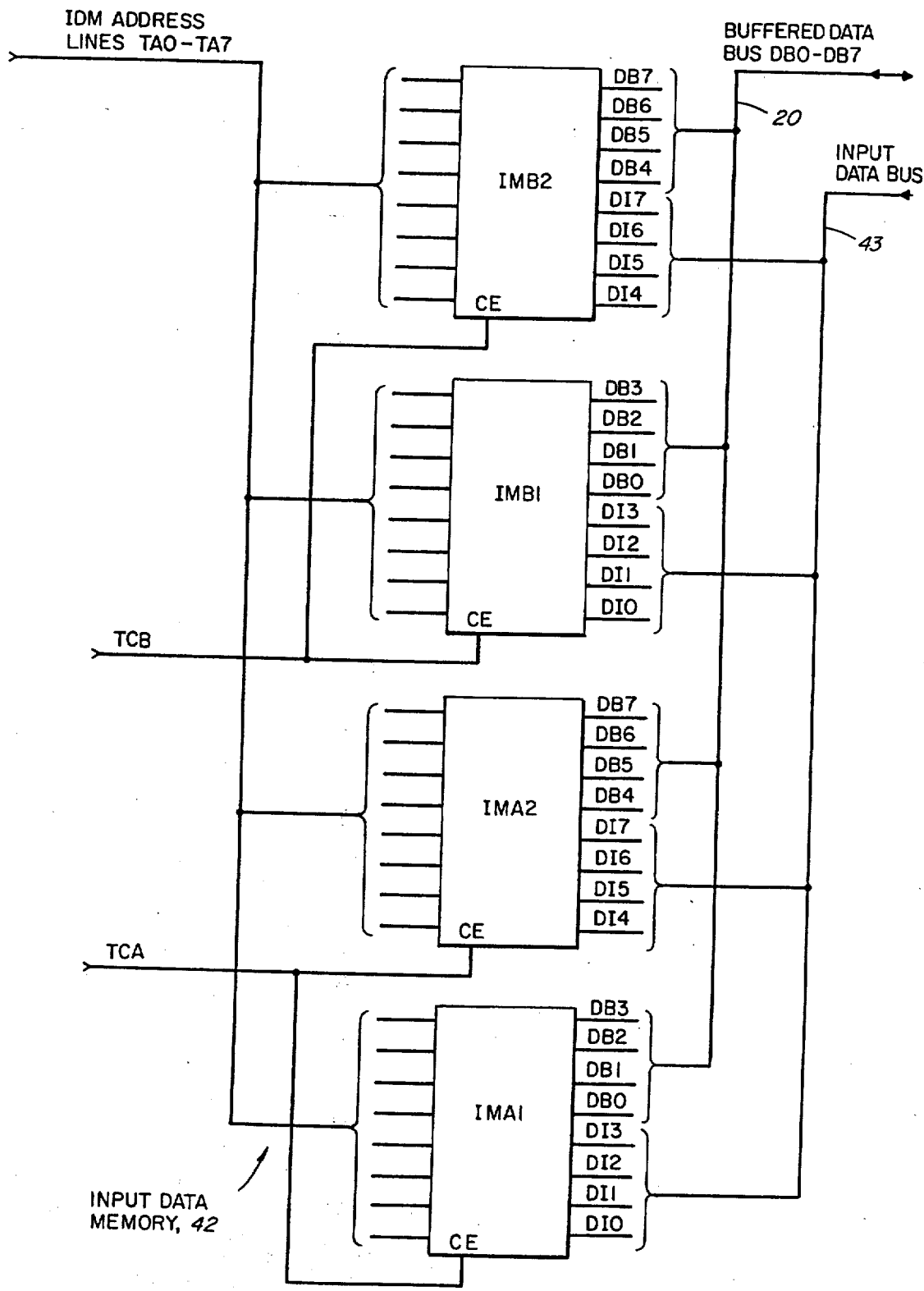
FIG. 7 is a schematic block and wiring diagram of an input data memory forming a part of the system of FIG. 6.

Referring again to FIG. 6, the system resends to external data supplied on eight lines generally designated 40 to a data decoder and input flag control unit 41 which functions in a conventional manner to translate any external coded data supplied into the system's sequential chain code and detects flag bits that signify that a complete line has been transmitted. The unit 41 supplies the chain codes to an input data memory 42 over a bus 43 comprising eight lines DI0–DI7 (FIG. 7). Referring to FIG. 7, the input data memory 42 is provided with separate input (DI0–DI7) and output (DB0–DB7; the buffered data bus 20) lines so that the codes for a line can be stored at input data rates and dealt with at slower speeds by the CPU.

As indicated in FIG. 7, the input data memory may comprise four memory units IMA1, IMA2, IMB1, and IMB2, each of which may be, for example, an Intel 2101-1 unit as described on pages 2-29 through 2-32 of the 1975 Intel Data Catalog, published in 1975 by Intel Corporation of 3065 Bowers Ave., Santa Clara, Calif. 95051. The memory is addressed by IDM address lines TA0–TA7, as indicated in FIGS. 6 and 7, with selections of stages under the control of chip enable signals TCA and TCB provided by an address multiplexer 44 next to be described in connection with FIG. 9.

Figure 9:
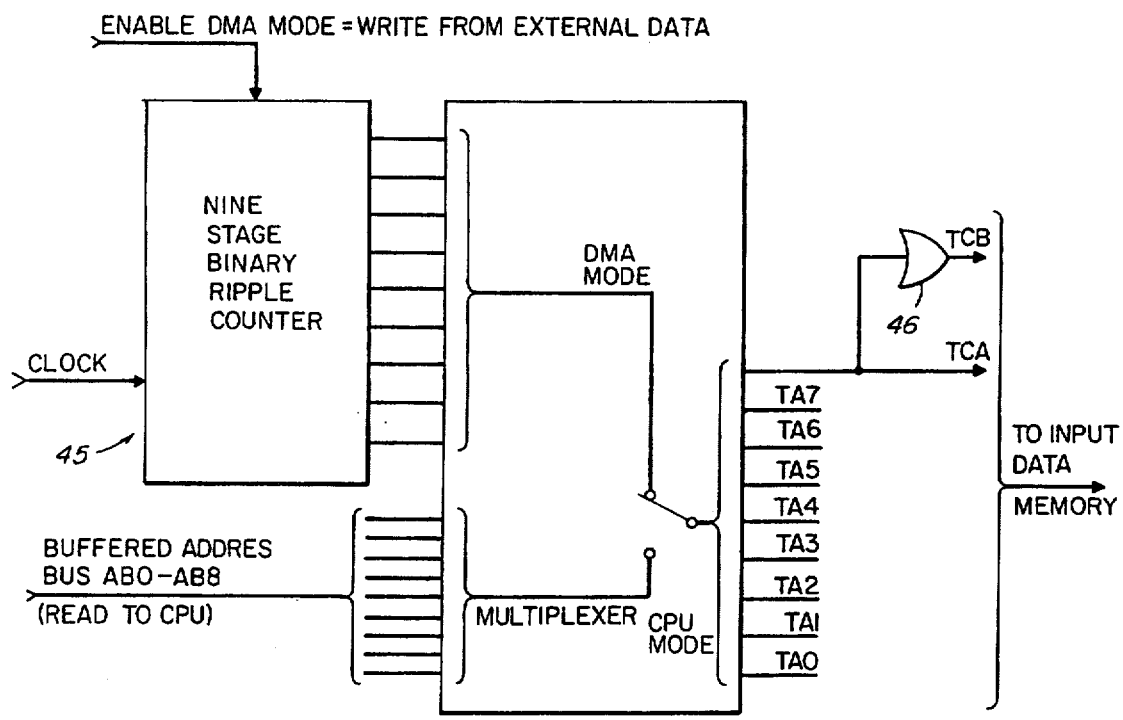
FIG. 9 is a schematic block and wiring diagram of an address decoder and multiplexer forming a part of the system of FIG. 6.

Referring to FIG. 9, the multiplexer 44 is shown in its functional aspect as a two-state switch that controls access to the input data memory of FIG. 7. In the direct memory access (DMA) mode, the multiplexer 44 accepts address data from a nine stage binary ripple counter 45 (FIGS. 6 and 9) of any conventional construction, providing address signals on the input data address leads TA0–TA7 and the signals TCA and TCB. The signal TCB may be derived from the signal TCA with an inverter 46, such as a Signetic type 7404. The multiplexer 44 may comprise three Signetics type 74157 units. The binary ripple counter 45 has been implemented with a counter comprising Signetics type 7474 and 74393 units, and with a Signetics 7400, 7402 and two type 7404 gates. The signals TCA and TCB select one set of the memory banks IMBA1-2 and IMB1-2 in FIG. 7 in a manner that will be apparent to those skilled in the art.

In the CPU mode, the multiplexer 44 connects the buffered address bus lines AB0–AB8 to the lines TA0–TA7 and TCA to address the input data memory under CPU control so that data can be read by the CPU on the lines DB0–DB7 of the buffered data bus 20 (see FIGS. 6 and 7).

Figure 8:
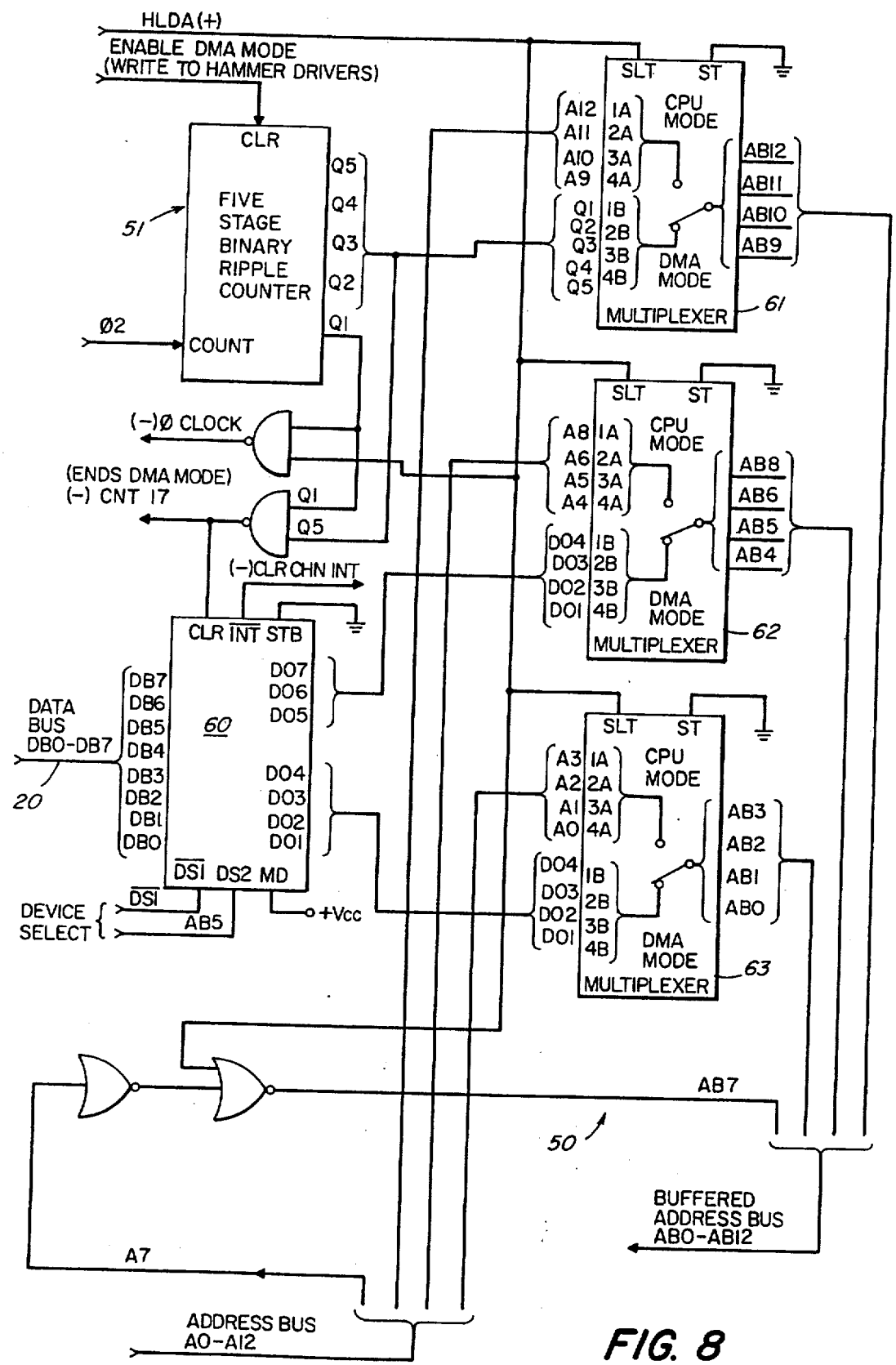
FIG. 8 is a schematic block and wiring diagram of data control circuits and an address multiplexer for input data load, forming a portion of the system of FIG. 6.

FIG. 8 shows the control circuits for loading the hammer driver systems B1–B8 (FIGS. 1 and 6) from the virtual image memory 7, and for reading and writing access to the virtual image memory 7 by the CPU. The apparatus generally comprises an address decoder and multiplexer generally shown at 50 in FIGS. 6 and 8, and DMA control circuits for hammer driver load generally shown at 51 in FIGS. 6 and 8.

In the DMA mode, which is initiated by a single output instruction that forces the CPU into a hold mode (HLDA+), the hammer driver registers are loaded from the virtual image memory under the control of a Schottky bipolar eight-bit input/output port 60 in FIG. 8 in response to data on the buffered data bus 20, together with a higher ordered address supplied by a five stage binary ripple counter 51. The states of three Signetics 74157 multiplexer 61, 62 and 63 are appropriately selected for this purpose by the signal HLDA(+) to enable the DMA mode by connecting the "B" inputs of the multiplexers 61, 62, and 63 to the appropriate buffered address terminals AB0-AB12 as shown in FIG. 8.

In the CPU mode, the CPU address buses A0-A12 are connected to the buffered address bus AB0-AB12 by the multiplexers b1-63 in the absence of the signal HLDA(+) at logic 1.

Having thus described the invention, what I claim is:

1. In combination with a high speed printer having n print hammers and n print hammer drivers for printing an n column line and a source-destination computer including a low speed CPU, an input data memory capable of accepting n character codes each directing which of a series of m characters is to be printed in a different one of the n columns in a line to be printed, a virtual image memory comprising a register for each of m characters for each of n columns in a line to be printed, means for loading said input data memory with n character codes for ach line to be printed under DMA control, said CPU being programmed to access said input data memory on a column by column basis and to load a zone of said virtual image memory for each character code stored in said data input memory for each column to be printed with a true bit for each character position for each column printing time at which printing of a corresponding character is to be printed, and means controlled by said printer for calling forth the contents of a different zone of said virtual image memory for each character coming into printing position relative to a predetermined column of said printer and distributing the contents of said zone to the print hammer drivers for each hammer in said printer.

2. In combination with a microprocessor equipped as a source-destination computer and comprising a CPU and adjuctive memory domains, a high speed chain printer, an input data memory for accepting a line of print in character codes arranged in column sequence, a virtual image memory organized by character and chain position and comprising n times m storage locations, where n is the number of columns printable by said chain printer and m is the number of different characters that can be printed in a column, a bank of hammer driver boards arranged by print position sequence, means responsive to an external device for loading said input data memory with character codes for a line to be printed under DMA control, means for loading said virtual image memory from said input data memory under CPU control with print command signals organized by character and print position sequence, and means controlled by said printer for loading said hammer driver boards with print command signals from said virtual image memory as each character approaches print position relative to a predetermined column under DMA control.

3. The apparatus of claim 2, in which said means for loading said virtual image memory under CPU control loads a true bit for each print position following the print position in which the printing of a character is to begin in order to prolong the printing time available for that character relative to the processing time allocated to the CPU.

4. An n column, m character high speed chain type printer combined with a source-destination computer comprising a CPU, a program interrupt sub-system, and adjunctive memory domains; an input data memory accessible by the CPU under program control and by an external device under DMA control; and a virtual image memory containing n×m storage locations accessible by the CPU under program control and by the printer under DMA control; said printer including a bank of hammer drivers accessible to the virtual image memory under DMA control by the printer.

5. In combination with a high speed printer having a one bit print command signal storage register for each of n columns in a line to be printed and a character signal generator for indicating which of a set of m characters is approaching printing position with respect to a reference one of said n columns, a source-destination microprocessor, an input data memory for storing a line of print in terms of n character codes each specifying one of said m characters to be printed in a different column of a line to be printed, means controlled by said microprocessor and an external source for loading said input data memory from said external source under DMA control, a virtual image memory comprising n times m bit storage locations each addressable by a different column and character address, means controlled by said microprocessor for processing each character code stored in said input data memory once each line to be printed and storing a command to print or not to print in a storage location in said virtual image memory located by the column address corresponding to the location of the processed character code in said input data memory and a character address determined as a function both of the column location of the processed character code and its column location, and means controlled by said character signal generator and said microprocessor for loading each print command signal register from said virtual image memory with the contents of said virtual image memory corresponding to all column addresses in said virtual image memory for the character address corresponding to the character approaching printing position with respect to said reference column.

6. An improved high speed printing system, comprising a source-destination microprocessor in combination with an input data memory, an n by m chain printer for printing any of m characters in n columns of a line, an n by m virtual image memory, means controlled by said printer for addressing said virtual image memory on a character position by character position basis under DMA control, means for storing a line of print in said input data memory under DMA control, and means for processing the stored line by the microprocessor into a processed data form suitable for storage in said virtual image memory and storing said processed data in said virtual image memory.

* * * * *